Figure 1:
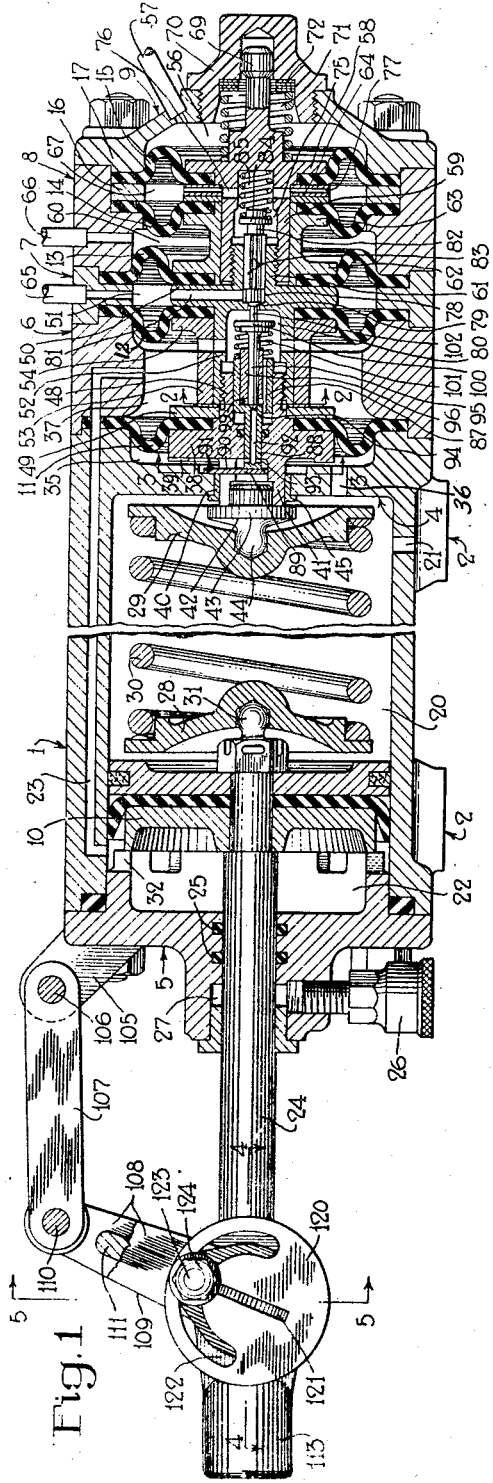
Figure 4:
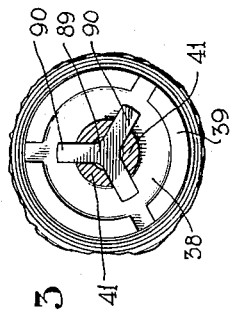

Dec. 31, 1946.  C. S. KELLEY  2,413,356
CONTROL DEVICE
Original Filed May 20, 1944

INVENTOR
Cecil S. Kelley
BY
ATTORNEY

Patented Dec. 31, 1946

2,413,356

UNITED STATES PATENT OFFICE 2,413,356

CONTROL DEVICE

Cecil S. Kelley, Forest Hills, Pa., assignor to The Westinghouse Air Brake Company, Wilmerding, Pa., a corporation of Pennsylvania Original application May 20, 1944, Serial No. 536,487. Divided and this application April 7, 1945, Serial No. 587,135

4 Claims. (Cl. 74—110)

This invention relates to control devices and more particularly to means for modifying the effect of movement of a control member, the present application being a division of my copending application, Serial No. 536,487, filed May 20, 1944.

Where fluid motors embodying a piston controlled by opposing pressures of fluid and of spring means is employed for adjusting a device to be controlled, the degree of movement of the piston effected by a change in the pressure of the controlling fluid will depend upon the "pick up," the deflection or rate of change in pressure characteristic, of the opposing spring means, i. e., if the "pick up" is relatively small the degree of movement of the piston for a certain change in the pressure of the controlling fluid will be greater than if the "pick up" were greater.

It is well known that in the manufacture of springs it is substantially impossible to produce on a commercial basis two springs having identical characteristics such as "pick up," although these characteristics are held within certain limits. Therefore a spring employed for controlling a piston such as above mentioned may have one degree of "pick up" or even a different degree.

If the piston above mentioned were employed for controlling a device having a certain fixed degree or range of movement, it will be apparent that a definite relation must exist between such movement and the pick up characteristic of the control spring on the piston, whereby the device being controlled will be accurately adjusted in accordance with the pressure of controlling fluid provided on the power piston. In other words, the full stroke of the piston must produce the full and definite or fixed range of movement of the device being controlled, although said stroke may be greater or less than said range of movement, dependent upon the "pick up" of the control spring.

One object of the invention is therefore the provision of a novel structure which is adjustable to provide a certain degree of movement of an operated member by an operating member having a different degree of movement.

Another object of the invention is the provision of means which is adjustable in accordance with the "pick up" of a spring acting on a fluid controlled piston such as above described, to provide a certain fixed degree of movement of a device controlled by said piston for a certain change in pressure of fluid on said piston.

Other objects and advantages will be apparent from the following more detailed description of the invention.

Figure 3:
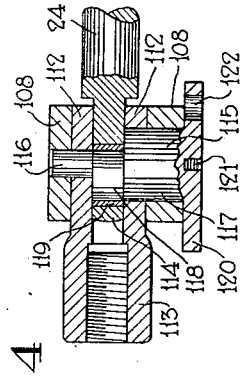
Figure 6:
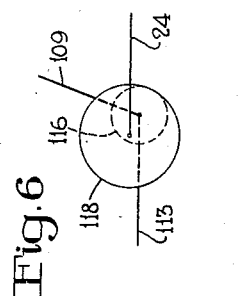
Figure 2:
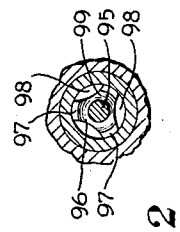
Figure 5:
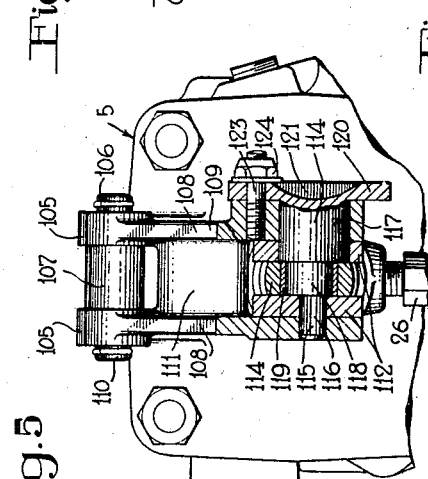

In the accompanying drawing, Fig. 1 is a longitudinal view, partly in section and partly in outline, of a control device embodying the invention; Figs. 2 to 5 are sectional views taken on lines 2—2, 3—3, 4—4 and 5—5, respectively, in Fig. 1; Figs. 2 and 3 being shown on an enlarged scale; and Fig. 6 is a line diagram of a portion of the structure shown in Figs. 1, 4 and 5.

Description

As shown in the drawing, the control device comprises a power cylinder 1 having mounting feet or lugs 2. One end of cylinder 1 is closed by an integrally formed non-pressure head 4, while the opposite end is closed by a removable pressure head 5. A pile or stack of substantially ring like casing sections 6, 7 and 8 are secured to each other and to the non-pressure head 4 in coaxial relation to cylinder 1. The casing section 6 at one end of the pile is mounted against the end of the cylinder, while secured to casing section 8, disposed at the opposite end of the pile, is a cover 9.

A power piston 10 is slidably mounted in the cylinder 1. Clamped around its peripheral edge between the end of cylinder 1 and one side of casing section 6 is a flexible diaphragm 11. Two oppositely arranged flexible diaphragms 12 and 13 are clamped, around their edges, between, respectively, the adjacent faces of casing sections 6 and 7, and 7 and 8. In the opposite face of casing section 8 is a recess in which are disposed the peripheral edges of two flexible diaphragms 14 and 15 and a spacer ring 16 separating said diaphragms from each other. The cover 9 has a ring like extension 17 projecting into the recess and engaging the edge portion of the adjacent diaphragm 15, whereby the diaphragms 14 and 15 are securely clamped between the casing section 8 and cover 9. All of these diaphragms are arranged in coaxial relation with each other and with the power piston 10. The flexing portions of diaphragms 11, 12 and 13 are of the same areas. The flexing portions of diaphragms 14 and 15 are each of a lesser area and their areas are equal to each other.

Between the power piston 10 and non-pressure head 4 is a non-pressure chamber 20 which is open to atmosphere through a passage 21, while between said piston and pressure head 5 is a power pressure chamber 22 which is open to a fluid pressure control passage 23. A rod 24 extending through piston 10 and secured thereto passes through pressure chamber 22 and a suitable bore in the pressure head 5 to beyond the outer surface thereof. The pressure head 5 is provided with two recesses spaced from each other and encircling the piston rod 24, and in each of these recesses there is disposed a sealing ring 25 providing a seal between the pressure head and said rod to prevent leakage of fluid under pressure from chamber 22 along said rod to atmosphere. A lubricating fitting 26 is secured to the pressure head 5 and is open to a lubricating recess 27 provided in said head around the piston rod whereby the portion of said rod which slides through said head may be lubricated as required.

The piston rod 24 projects slightly beyond the rear face of piston 10 into non-pressure chamber 20 wherein it is provided with a spherical like end 31 which fits in a recess provided at the center of one side of a spring seat or follower 28. A like follower 29 is oppositely arranged adjacent the non-pressure head 4 and extending between and having contact at its opposite ends with these two followers is a coil control spring 30. This spring is confined between the two followers under pressure for urging said piston in the direction of the left hand upon release of fluid under pressure from chamber 22 and for opposing movement of said piston in the opposite direction upon supply of fluid under pressure to chamber 22. The extreme left hand position of piston 10 is determined by contact of said piston with a stop 32 provided on the pressure head 5.

Between non-pressure head 4 and diaphragm 11 is a chamber 35 which is open through a passage 36 to non-pressure chamber 20. Between the two diaphragms 11 and 12 is a chamber 37 to which is connected passage 23 leading from the pressure chamber 22. A diaphragm follower 38 disposed in chamber 35 in coaxial relation with diaphragm 11 has one side in contact with the adjacent surface of said diaphragm and is provided on its opposite side with a plurality of raised stops 39 for contact with the adjacent side of the non-pressure head 4. The non-pressure head 4 is provided centrally with a bore which is lined with a bushing 40 and slidably mounted in this bushing are three sectors of a ring like projection 41 of the follower 38, said sectors being equally spaced from each other. A strut member 42 mounted in the projection 41 is provided with a stop flange 43 which is supported by the end of said projection. Projecting from the opposite side of member 42 is a cylindrical like head 44 disposed in the recess in follower 29 for supporting said follower. It will be noted that follower 38 and member 42 are capable of movement in either direction in bushing 40. The bushing 40 is provided in the non-pressure chamber 20 with an outturned collar 45 which is disposed in contact with the inner surface of the non-pressure head. This collar is arranged for contact with member 42 to limit movement of the member in one direction.

The diaphragm follower 38 has a hollow projection 48 extending centrally therefrom through an axial opening in diaphragm 11 into chamber 37, and disposed in this chamber and mounted over said projection against the adjacent face of diaphragm 11 is a follower plate 49.

A combined spacer and follower 50 is disposed in a chamber 51 formed between the two diaphragms 12 and 13 and has its opposite faces in contact with the adjacent faces of said diaphragms. The follower 50 has a sleeve like member 52 projecting centrally from one side through an axial opening in diaphragm 12 into chamber 37, and slidably mounted on this member in said chamber is a sleeve 53 one end of which contacts the follower plate 49 which is in contact with diaphragm 11. At the opposite end of sleeve 53 is a follower plate 54 which contacts the adjacent face of diaphragm 12. The projection 48 of follower 38 is provided with external screw-threads, while the sleeve 52 encircling said projection has internal screw-threads cooperating with those on said projection. Turning of the follower 50 and sleeve 52 relative to and onto the projection 48 of follower 38 will therefore clamp the central portions of the two diaphragms 11 and 12 between their respective followers and secure such parts together for movement in unison.

Between the cover 9 and diaphragm 15 is a pressure chamber 56 which is open to a control pipe 57, and which contains a follower plate 58 engaging the adjacent side of said diaphragm. This plate constitutes a flange provided at one end of a sleeve 59 which extends through central openings provided in the diaphragms 15 and 14, and in ring like spacer means 64 interposed between and engaging adjacent faces of said diaphragms, said sleeve extending into a chamber 60 formed between the two diaphragms 13 and 14. The follower 50 arranged between diaphragms 12 and 13 has a hollow boss 61 extending through a central opening in diaphragm 13 into chamber 60 wherein said boss is provided with external screw-threads cooperating with internal screw-threads provided in sleeve 59. Slidably mounted on sleeve 59 within chamber 60 is a member having at one end a follower plate 62 contacting diaphragm 13 and having at the opposite end a follower plate 63 contacting diaphragm 14. By tightening sleeve 59 on boss 61, the central portion of diaphragm 13 will be clamped between followers 50 and 62, and the central portions of diaphragms 14 and 15 will be respectively clamped between follower 63 and spacer means 64, and said spacer means and plate 58. With the parts assembled in the manner so far described, it will be noted that the central portions of all of the diaphragms, the stop 42 and the adjacent spring follower 29 are all movable as a unit.

Chamber 51 between diaphragms 12 and 13 is connected to a pipe 65 adapted to be supplied with fluid under pressure from any suitable source. Chamber 60 between the diaphragms 13 and 14 is adapted to be connected to an adjustment modifying pipe or what may be called a vernier control pipe 66. Between diaphragms 14 and 15 is a chamber 67 which is in constant communication with chamber 51 in a manner which will be later described.

The follower plate 58 has an axial projection 69 extending through control chamber 56 and with its end disposed to slide in a guide bore in a cap 70 removably secured by cooperating screw-threads to the cover 9. Encircling the projection 69 is a coil balance spring 71, one end of which bears against the plate 58. The opposite end of spring 71 is supported on one or more shims 72 carried in the cap 70.

Within sleeve 59 is a chamber 75 which is open through one or more radial bores 76 in said sleeve and aligned radial bores 77 in spacer means 64 to chamber 67. The boss 61 has an axial bore 78 open at one end to chamber 75, while its opposite end is open through a seat, provided for engagement by a supply valve 79, to a chamber 80 provided in member 52. At the end adjacent the supply valve 79, the bore 78 is open through one or more radial bores 81 to the fluid pressure supply chamber 51.

The supply valve 79 is provided on one end of a stem 82 extending through bore 78 into chamber 75 and said stem is provided with a plurality of longitudinally extending spaced ribs 83 having sliding contact with the wall of said bore, said ribs terminating short of said valve a distance equal at least to the width of the radial port 81. In chamber 75 the valve stem 82 is provided with an enlarged head 84 which is engaged by one end of a coil spring 85. The opposite end of this spring seats on the end wall of said chamber, which spring is constantly effective to urge the supply valve 79 toward its seat with a relatively light degree of force.

The projection 48 of follower 38 is provided with an axial bore open at one end to chamber 80, and slidably mounted in this bore and extending into said chamber is a plunger 87. The plunger has a stem 88 extending through a bore provided in follower 38 into the space within the projection 41. The end of stem 88, within the projection 41, is supported on a member 89 having radiating fingers 90 extending through the spaces between the sectors of projection 41 and supported on a suitable annular shelf 91 provided on the non-pressure head 4.

The stem 88 is provided with an axial bore 92 open at the end adjacent support member 89 to a plurality of radial bores 93 leading to the space within the projection 41 which space is open to atmosphere through the space between the sectors of said projection and thence by way of non-pressure chamber 20 and passage 21. The opposite end of bore 92 is opened to the interior of the plunger 87 through a valve seat provided for engagement by a fluid pressure release valve 94.

The release valve 94 is provided on one end of a pin 95 which is mounted to slide in a bore provided through a suitable guide 96 disposed in the plunger 87. This guide is provided with three spaced guide ribs 97 (Fig. 2) which engage the wall of the plunger, and between these guides are spaces 98 for allowing flow of fluid under pressure from chamber 80 at one end of the guides to an annular recess 99 at the opposite end, the release valve 94 being contained in said recess.

The release valve pin 95 extends into chamber 80 and therein is provided with a head 100, and between this head and the adjacent end of plunger 87 is interposed a coil spring 101 which constantly tends to urge the release valve 94 away from its seat. The supply valve 79 is provided with a stem 102 loosely extending through the seat for said valve and engaging the head 100 which is at all times maintained in contact with said stem by spring 101, whereby the supply valve 79 and release valve 94 will move in unison.

Projecting from pressure head 5 is a bracket 105 and connected to said bracket by a pin 106 is one end of a rockable link 107. The other end of link 107 is disposed between outer ends of two arms 108 of a lever 109 and is rockably connected thereto by a pin 110. The two arms 108 are integrally connected intermediate their ends by a bridge 111. Disposed between the opposite ends of the two arms 108 are jaws 112 provided on one end of a member 113 which is provided for connecting the device to the means to be operated, such as an engine governor. The piston rod 24 has a tongue 114 disposed between the jaws 112.

The piston rod 24 is connected to the member 113 and the ends of the lever arms 108 by a pivot pin 115 having an axial portion 116 at one end extending through and operatively connecting one of the lever arms 108 to the adjacent jaw 112. The pivot pin 115 has another axial portion 117 extending through and operatively connecting the other lever arm 108 to the jaw, and the two axial portions 116 and 117 are connected by a part in the form of an eccentric 118 which extends through and operatively connects the piston rod 24 to the pivot pin 115 and thereby to member 113. The eccentric 118 bears in the tongue 114 of the piston rod against a bushing 119 provided in said rod.

The axial portion 117 of the pivot pin 115 is of greater diameter than the axial portion 116 and bears at its inner end against the adjacent face of the piston rod tongue 114. On the outer end of the axial portion 117 is an adjusting disc 120 bearing against the adjacent lever arm 108. This disc is provided across its outer face with a screw driver slot 121 for turning the disc and pin 115 relative to the piston rod 24 and other connected parts. The disc 120 also has a semi-circular through slot 122 adjacent its peripheral edge through which extends a stud 123 secured in the adjacent lever arm 108. A nut 124 on stud 123 is provided for securing the disc 120 and thereby the pivot pin 115 to the adjacent lever arm 108 for movement therewith. Loosening of nut 124 provides for adjustment of the pivot pin 115 relative to the lever 109 and member 113 and thereby angular adjustment of eccentric 118 relative to the end of the piston rod 24.

The adjusting slot 122 is so arranged in the disc 120 that with the disc secured in a position with the stud 123 at the center of slot 122, a line intersecting the axes of the pivot pin 115 and eccentric 118 will be vertical to a line intersecting the axes of the pivot pin and of pin 110 at the opposite end of lever 109. Adjustment of the pivot pin 115 by turning disc 120 in a counter-clockwise direction, as viewed in Fig. 1, will increase the distance between the center of the eccentric and pin 110 and thereby increase the length of the lever arm for the piston rod 24, while adjustment in a clockwise direction will decrease said distance and lever arm. The adjustments of the pivot pin 115 do not change the connections between said pin and the lever 109 or member 113, but only the connection between the piston rod 24 and the pin 115. These facts are believed to be clearly brought out in the line diagram in Fig. 6 wherein the pivot pin is indicated by the portion 116 thereof and to the center of this portion are connected lines indicating the lever 109 and member 113. The eccentric 118 is shown in the neutral position occupied with the adjustment of disc 120 as in Fig. 1 and above described, and connected to the center of the eccentric is a line indicating the piston rod 24. The purpose of this structure including the eccentric 118 will be hereinafter brought out.

*Operation*

In operation, let it be assumed that member 113 is connected to the device which it is desired to operate or adjust. Let it further be assumed that the fluid pressure supply pipe 65 is connected to a suitable source of fluid under pressure; that the control pipe 57 is connected to a suitable operator's control valve device, and that the vernier control pipe 66 is connected to a suitable operator's vernier control valve device.

With pipe 65 supplied with fluid under pressure from the source, fluid under pressure will equalize into chamber 51 between the two diaphragms 12 and 13 and thence past the ribs 83 on the supply valve stem 82 into chamber 75 and from chamber 75 through bores 76 and 77 into chamber 67 between the diaphragms 14 and 15. The pressure of fluid in chamber 51 acting on diaphragm 12 counteracts said pressure acting on diaphragm 13, and vice versa, and the same is true with respect to said pressure in chamber 67 acting on the diaphragms 14 and 15, so that such pressure will have no effect upon operation or positioning of the structure longitudinally of the device.

It is intended that by operation of the operator's vernier control valve device fluid at a chosen nominal pressure, such as twenty-five pounds, will normally be provided through pipe 66 in chamber 60 between the two diaphragms 13 and 14, and since the diaphragm 13 is of greater diameter than diaphragm 14, this pressure will create a force acting in the direction of the left hand, as viewed in the drawing, equal to the pressure of such fluid times the difference in areas of the two diaphragms.

The minimum pressure normally provided through control pipe 57 in chamber 56 to act on diaphragm 15 is preferably of a chosen low degree, such as five pounds, and in use, the operator's control valve device is intended to vary the pressure of fluid in chamber 56 only between this low pressure and a selected higher pressure such as fifty pounds. It will be noted that this pressure effective on diaphragm 15 also creates a force urging the parts of the device in the direction of the left hand. The pressure of spring 71 also acts on diaphragm 15 in the same direction.

The pressure of spring 71 is so adjusted by shims 72 that its force plus the minimum pressure of fluid (five pounds) acting in chamber 56 on diaphragm 15, plus the force created by the normal pressure (twenty-five pounds) of fluid in chamber 60 acting on the differential areas of diaphragms 13 and 14 will, with the parts of the device in the positions shown in the drawing, just balance the opposing force of control spring 30 applied through stop 42 to the followers, spacers, sleeves, etc., connecting the central portions of the several diaphragms together. With the parts of the device positioned as shown in the drawing, the stop flange 43 of the strut member 42 is slightly spaced away from stop collar 45 carried by the non-pressure head 4 of cylinder 1, permitting the plunger 87 to be positioned with respect to the member 89, which is fixed with respect to the casing, so that the supply valve 79 will be closed by spring 85 and the release valve 94 will also be closed by said spring acting through the supply valve and the stem 102 projecting therefrom and contacting the release valve. Under this condition pressure in chamber 37 and pressure chamber 22 will be at such a low degree, for reasons which will hereinafter be brought out, that piston 10 will be in contact with stop 32 and the operated member 113 will be occupying the position shown in the drawing.

If the operator now desires to move the operated member 113 in the direction of the right hand to effect an adjustment of the device being controlled, he will increase, through control pipe 57, the pressure of fluid in chamber 56 acting on the diaphragm 15. This increase in pressure of fluid will destroy the balance of forces above mentioned, and produce a force exceeding that of spring 30, as a result of which the central portions of the several diaphragms and the connecting sleeves, etc. will move in the direction of the left hand to a position limited by contact between stops 39 on follower 38 and the non-pressure head 4. This movement will be relative to the member 89 and plunger 87 which are supported by the casing against movement, and as a result the release valve 94 will remain stationary and act through pin 95 and its head 100, and stem 102 projecting from the supply valve 79 to hold said supply valve against movement, so that the seat for the supply valve will move out of contact therewith. Fluid under pressure will then flow from chamber 51 past the supply valve 79 to chamber 80 and thence to chamber 37 between the two diaphragms 11 and 12 and from the latter chamber through passage 23 to pressure chamber 22. Since the diaphragms 11 and 12 are of equal areas, the pressure of fluid obtained in chamber 37 and acting on either diaphragm in one direction is counterbalanced by its opposing effect on the other diaphragm, as will be apparent.

When the pressure of fluid thus provided in pressure chamber 22 is increased sufficiently to overcome the opposing force of spring 30 on piston 10, said piston will move away from stop 32 against the opposing pressure of spring 30 and thereby act through the rod 24 to draw the member 113 toward the right hand towards its new position.

The piston 10 as it is being moved under the pressure of fluid provided in chamber 22, will act to compress spring 30 and thus increase the spring force applied through follower 29 and stop 42 to the central portions of the diaphragms. When this force is increased to a degree substantially equaling the increase in the opposing force created by the increase in pressure of fluid in diaphragm chamber 56, said spring will act to move strut member 42, the central portions of the diaphragms and the connecting sleeves back in the direction of the right hand. This movement will be relative to plunger 87 and to the release valve 94 and supply valve 79 which are at this time supported by said plunger, and will continue until the seat for the supply valve moves into contact with said supply valve. The supply of fluid under pressure to pressure chamber 22 will thus be cut off when it is increased to a degree for sufficiently increasing the pressure of spring 30 to offset the increase in pressure of fluid in the control chamber 56, and to thus restore the balance of opposing forces, above mentioned.

It will now be seen that the piston 10 will be moved away from the stop 32 a distance corresponding to the pressure of fluid provided in chamber 22, and thus corresponding to the increase in pressure of fluid in control chamber 56, and it will be further noted that the operated member 113 and device being controlled will be also adjusted to correspond.

If the operator desires to cause the member 113 to move further in the direction of the right hand, he will increase the pressure of fluid in chamber 56 thereby again destroying the balance of opposing forces, and the structure will then operate in the same manner as above described to cause a corresponding new adjustment of member 113. Within the limits of the device, the member 113 can thus be caused to move from the position shown in the drawing to any selected position to the right hand side thereof, and such movement may be effected in any desired steps, by providing in the control chamber 56 fluid at the proper selected pressures.

With the member 113 adjusted out of its normal position in the direction of the right hand, if the operator should desire to cause said member to move back toward the position in which it is shown in the drawing, he will reduce the pressure of fluid in chamber 56, whereupon the force of spring 30 will exceed the opposing forces and acting through strut member 42 will shift the diaphragms and supply valve 79 in the direction of the right hand from the positions shown in the drawing. Due to the action of spring 101, the release valve 94 will move with the supply valve and thus be shifted out of seating engagement with the plunger 87 which will be held by spring 101 in contact with member 89 and thus against movement. When the release valve 94 is thus opened, fluid under pressure will then be released from pressure chamber 22 through passage 23, chambers 37 and 80, spaces 98, recess 99, passages 92 and 93 in the plunger stem 88 and thence to atmosphere.

As the pressure of fluid in pressure chamber 22 is thus reduced, the spring 30 will expand and move the piston 10 back toward its normal position, and a reduction in the force of said spring against the diaphragms will occur. Assuming that the pressure in control chamber 56 is not reduced to its normal value (five pounds) then when the pressure of fluid in pressure chamber 22, and consequently the pressure of spring 30 has become reduced to substantially the same degree as the opposing forces including the reduced pressure of fluid in chamber 56, said opposing forces will gradually shift the diaphragms and both the supply and release valves toward the left hand, and at the time the balance between opposing forces is obtained, the release valve 94 will engage its seat and thus prevent further release of fluid under pressure from chamber 22. Thus the reduction in pressure of fluid in chamber 22 will be limited in proportion to the reduction in control pressure in chamber 56, and the piston 10 will therefore move the member 113 to a corresponding position.

In case the operator effects a further reduction in the pressure of fluid in chamber 56 the structure will again operate as just described to effect a corresponding further reduction in pressure in chamber 22 and a corresponding change in position of piston 22 and of member 113. The member 113 may be thus caused to return toward its normal position in any desired steps as selected by the degrees of reduction in pressure of fluid in chamber 56.

In case the pressure of fluid in chamber 56 is reduced to its normal minimum value of five pounds, the structure will again operate in the same manner as above described to open the release valve 94 and permit further release of fluid under pressure from piston chamber 22. Under the action of spring 30, the piston 10 will then move back into contact with stop 32, permitting the pressure of said spring to reduce to its normal value. As the force of spring 30 is thereby reduced, the normal pressure of fluid in chamber 56 plus the pressure of spring 71 will return the diaphragms to their normal positions and seat the release valve 94 at substantially the time the piston contacts stop 32, thereby bottling the remaining fluid in chamber 22, which pressure may be near atmospheric pressure or of a greater degree, depending upon the confined force of spring 30. This is however immaterial, since the return of piston 10 to its normal position upon reducing the pressure of fluid in the control pipe 57 to the normal value will cause return of the member 113 to its normal position, as will be apparent. It will now be seen that the member 113 may be adjusted out of normal position to any selected position or in the reverse direction to any selected position, or may be returned to normal position by providing fluid at the proper selected pressure or pressures in chamber 56.

If the member 113 cannot be adjusted with a sufficient degree of accuracy by varying the pressure in chamber 56, then after, what may be termed a rough adjustment in response to a selected pressure change in said chamber, the operator may effect a fine adjustment of said member by effecting through pipe 66 a change in pressure in the vernier control chamber 60. An increase in pressure of fluid in chamber 60 will increase the force opposing spring 30, while a reduction in pressure of fluid in chamber 60 will reduce the force opposing spring 30, and the device will operate in response to such increase or decrease in pressure of fluid in chamber 60 to effect a proportional change in position of member 113 in either one direction or in the opposite direction in the same manner as before described. It is desired to point out that for a certain change in pressure of fluid in chamber 60 the change in force is only a fraction of that resulting from a like change in pressure of fluid in the main control chamber 56, due to the diaphragm 15 being of greater area than the difference in areas of diaphragms 13 and 14. Hence a finer change in force and adjustment of member 113 may be effected by varying pressure of fluid in chamber 60.

This fine or vernier control of adjustment of member 113 is of particular value in for instance multiple engine installations where the speed or power output of all engines is arranged for control in unison from a master controller and it is desirable to match the output of the engines. In an installation embodying say two engines, both would be provided with a control device such as shown in the drawing and the pressure chamber 56 in both devices would be connected to a common operator's control valve. By operating the control valve the operator could then accelerate or decelerate the engines in unison to any desired degree. Then in case the speeds or outputs of power of the two engines were not identical, the operator by proper adjustment of pressure of fluid in chamber 60 of one of the control devices could change the speed or output of the respective engine to the same degree or value as that of the other engine.

In such an installation, the vernier control of one engine might be sufficient to match the two engines. At the other engine, pipe 66 would not therefore be required and chamber 60 could be open to atmosphere with a consequent loss of force for opposing spring 30. This loss of force may however be compensated for by placing additional shims 72 under the spring 71 so that the device will operate in harmony with the other device having fluid pressure in chamber 60.

In the manufacture of springs, such as spring 30, it is substantially impossible to produce on a commercial basis two springs having identical characteristics. Springs are therefore usually manufactured to certain limits, so that with respect to spring "pick up" a greater degree of deflection may be required to obtain a certain spring force with one spring than would be required with another spring, and as applied to spring 30, the one spring would allow greater movement of piston 10 away from stop 32 than would be permitted by the other spring with piston 10 subject to fluid at the same degrees of pressure. Stated in another way, with the maximum control pressure provided in diaphragm chamber 56, and in pressure chamber 22, a spring 30 with greater "pick up" would permit less total movement of piston 10 away from stop 32 than would occur with a spring with less "pick up." Consequently the total stroke of piston 10 will depend upon the "pick up" of the particular spring 30 employed, and in different devices or in the same device in case spring 30 is changed; may therefore be either greater or less than the normal chosen stroke.

If the member 113 is connected to a member for controlling an engine governor which latter member has a fixed range of movement to provide for varying of engine speed from minimum to maximum, then it is necessary to provide for adjustment of the connection between the member 113 and the piston rod 24 according to the "pick up" characteristic of the spring 30 so as to limit the range of movement of member 113 to the fixed degree in case the stroke of piston 10 as permitted by said spring is greater or less than said fixed degree. This adjustment is accomplished by the means including the eccentric 118.

With the eccentric 118 and adjusting disc 120 adjusted as shown in Figs. 6 and 1, respectively, the axis of the connection between the piston rod 24 and said eccentric will merely move from the position shown in Fig. 6 above the axis of the connection between member 113 and the pivot pin 115 or portion 116 thereof, to a corresponding position below, so that the movement of member 113 will be the same as that of piston rod 24. This adjustment of the eccentric will be employed in case the "pick up" of spring 30 is normal.

Now if the adjusting plate 120 is turned counterclockwise from normal position to the extent limited by contact with stud 123, the axis of the connection between the piston rod 24 and eccentric 118 will be moved to and remain below the connections between member 113 and the pivot pin 115 thereby providing for a maximum movement of piston 10 in excess of the required movement of member 113. Lesser degrees of movement of piston 10 in excess of the required movement of member 113 may be obtained by suitable adjustments of disc 120 between normal position and the position above mentioned defined by stud 123. Thus if the "pick-up" of spring 30 is less than normal, the proper adjustment of disc 120 counterclockwise from its normal position will match the movement of piston 10 to the fixed range of movement of member 113.

On the other hand, if the "pick up" of spring 30 is greater than normal which would result in less movement of piston 10 than required of member 113 the disc 120 may be turned from its normal position in a clockwise direction which will raise the axis of the connection between the piston rod 24 and eccentric to a point above the axis of the connection between member 113 and the pivot pin 115, so that the lever 109 will act to increase the movement of member 113 with respect to that of the piston rod. By suitable adjustment of disc 120 to the spring 30 the fixed degree of movement of member 113 can therefore be obtained.

Thus regardless of the "pick up" characteristic of the particular spring 30 used in the device, within the permissible limits of variations of said spring, adjustment of the eccentric 118 to the particular spring will limit the range of movement of member 113 to the desired fixed degree, or will provide for obtaining such fixed degree of movement, as the case may be.

After adjusting the eccentric it must be locked to lever 109 in the adjusted condition by tightening nut 124 against disc 120.

Summary

It will now be seen that I have provided a relatively simple, compact and efficient device embodying a fluid motor and fluid pressure controlled means for controlling said motor. The structure is particularly applicable for control from a remote control station to provide prompt and accurate adjustments of a device to be controlled, and where the adjustments are within a given range, the operation of the structure may be regulated to meet the range regardless of permissible variations in the control spring.

Having now described my invention, what I claim as new and desire to secure by Letters Patent is:

1. In combination, a member to be operated having a fixed range of movement, actuating means for moving said member having a different range of movement, and means connecting said actuating means and member comprising a lever having a fulcrum, pivot means carried by said lever at a point removed from said fulcrum and operatively connecting said member and actuating means, said pivot means comprising an eccentric adjustable to render said actuating means movable through its full range of movement to move said member through its fixed range, and means arranged to secure said pivot means to said lever in an adjusted condition.

2. In combination, a member to be operated having a fixed range of movement, an operating member having a different range of movement, and means connecting the two members comprising a lever having a fulcrum, and adjustable means carried by said lever at a point removed from said fulcrum and having one connection with the operated member and another with said operating member and operable upon movement of said operating member to move said operated member, said adjustable means being adjustable relative to said lever to vary the distance between said fulcrum and the connection with one of said members to thereby render said operating member movable through its full range of movement to effect movement of said operated member through its fixed range, and means operable to secure said adjusting means to said lever in an adjusted condition.

3. In combination, an operating member, an operated member adapted to be moved by said operating member and arranged in substantial end to end relation with said operating member, and means operatively connecting said members comprising a lever rockable about a fulcrum, pivot means carried by said lever at a point removed from said fulcrum and operatively connected to one of said members, an eccentric associated with said pivot means operatively connecting said lever to the other member, said eccentric being adjustable relative to said lever to vary the distance between said fulcrum and the axis of the connection with the respective member to thereby provide for a different degree of movement of one member than of the other member, and means arranged to secure said eccentric to said lever in an adjusted condition.

4. In combination, a member to be operated having a fixed range of movement, a spring, a piston subject to pressure of said spring and adapted to be subjected to opposing pressure of fluid and movable against said spring upon a certain increase in the pressure of said fluid to an extent for increasing the pressure of said spring to a degree to counterbalance the increase in pressure of fluid, said extent of movement being determined by the increase in pressure characteristic of said spring, and means operatively connecting said piston to operate said member comprising a lever having a fulcrum, pivot means carried by said lever at a point removed from said fulcrum and operatively connecting said lever to said member, and eccentric means associated with said pivot means operatively connecting said lever to said piston and adjustable relative to said lever to provide for said extent of movement of said piston moving said member from one end to the opposite end of its fixed range of movement, and means adapted to secure said eccentric to said lever in an adjusted condition.

CECIL S. KELLEY.